March 28, 1961  J. B. MONROE  2,976,664
ROTARY MOWER

Filed April 14, 1958  5 Sheets-Sheet 1

Fig. 1

INVENTOR.
JOSEPH B. MONROE
BY
*Jerry J. Dunlap*
ATTORNEY

Fig. 4

March 28, 1961 J. B. MONROE 2,976,664
ROTARY MOWER

Filed April 14, 1958 5 Sheets-Sheet 5

Fig. 8

INVENTOR.
JOSEPH B. MONROE
BY
*Jerry J Dunlap*
ATTORNEY

United States Patent Office 2,976,664
Patented Mar. 28, 1961

2,976,664

ROTARY MOWER

Joseph B. Monroe, 1216 S. Grand, Cherokee, Okla.

Filed Apr. 14, 1958, Ser. No. 728,263

14 Claims. (Cl. 56—25.4)

This invention relates, as indicated, to improvements in rotary mowers, and more particularly, but not by way of limitation, to an improved rotary mower adapted for mowing vegetation around obstructions such as posts, trees and the like.

Almost all areas requiring periodic mowing contain various types of obstructions, such as posts and trees, which have heretofore required excessive manipulations of the mower being used to cut the vegetation growing in the area, as well as additional hand clipping or cutting operations. The post and tree problem is particularly bothersome in the caretaking of highway right-of-ways. At the present time, the operator of a mower drives his mower against one side of a post, then backs the mower up and brings it as close as possible along an adjacent side of the post and then after passing the post, must back up to cut the vegetation adjacent another side of the post. Even then hand clipping or cutting operations are required to finish the caretaking operation. In other words, with all present day mowers some of the vegetation will remain around each post standing in the right-of-way, such that manual clipping operations are a necessity to completely trim the vegetation around the post. Also, the frequent starting, stopping and backing up of the mower requires an excessive amount of time for the cutting operation, and unduly increases the cost of the complete caretaking operation.

Previous mower constructions have been devised to provide more or less of an "orbit" of a mower around a portion of a post, as the mower is being moved by the post, to cut the vegetation growing around about one-half the periphery of the post. Heretofore, however, such mowers have been supported on the end of a horizontally pivotable frame and have generally required that the mower make direct contact with the post in order that the mower will be moved in a somewhat circular path around the post. In other words, the mower housing is driven into contact with the post at whatever speed the mower is being propelled along the ground. Most highway right-of-way mowers are driven by tractors and are normally operated at a forward speed of from three to five miles an hour. It will be apparent that when a mower being driven at this speed comes into direct contact with a stationary post, a substantial shock will be imposed on the mower construction. None of these prior, laterally pivotable, mower constructions have been widely accepted.

The present invention contemplates a novel rotary mower construction wherein the cutter and cutter housing will be automatically pivoted laterally as the mower approaches a post, and will be returned to its normal operating position as the mower passes a post, whereby vegetation growing around at least one-half the periphery of the post may be effectively cut in a single pass of the mower by the post. The present invention contemplates a castor assembly supporting the mower cutter and housing and operated by a trigger system arranged to contact the post being approached by the mower, to pivot the castor assembly and guide the cutter around the post. This invention also contemplates the use of a bumper system to contact the post, assist in turning the cutter and housing around the post, and minimize the contact of the post by the mower housing. This invention further contemplates a trigger operated hydraulic ram for moving the mower housing and cutter around a post or the like. The preferred embodiment of the present invention includes novel supporting means for driving a mower housing and cutter from a tractor or the like, such that the cutter will follow the contour of the ground over which it is moved, yet will be vertically stablized to prevent unnecessary vertical vibrations of the mower construction.

An important object of this invention is to reduce the time presently required in the caretaking of all areas requiring periodic mowing, and particularly highway right-of-ways.

Another object of this invention is to provide a rotary mower construction which will mow a path around at least one-half the periphery of an obstruction such as a post or the like.

A further object of this invention is to provide a mower construction which will be moved automatically in an orbital path around a post or the like, with the imposition of a minimum shock on the mower construction.

Another object of this invention is to provide a novel trigger system on a pivotally supported rotary mower for guiding the mower in a circular path upon actuation of the trigger system.

Another object of this invention is to provide a mower cutter and housing which may be pivoted both horizontally and vertically with respect to its pulling frame, yet will be stabilized against undue vertical vibration in following the contour of the surface over which the mower is moved.

A still further object of this invention is to provide a novel mower construction adapted for cutting vegetation around posts and the like which is simple in construction, will have a long service life and which may be economically manufactured.

Other objects and advantages of the invention will be evident from the following detailed description, when read in conjunction with the accompanying drawings which illustrate my invention.

The present invention is particularly adapted for use in connection with large mowers operated by tractors, and normally designed for use in the caretaking of highway right-of-ways and the like. Therefore, the present detailed description will be confined to this particular use and environment. It will be understood, however, that the present invention may be used in smaller mower designs, such as are used for mowing lawns, and similar advantages and benefits will be obtained.

Figure 1:
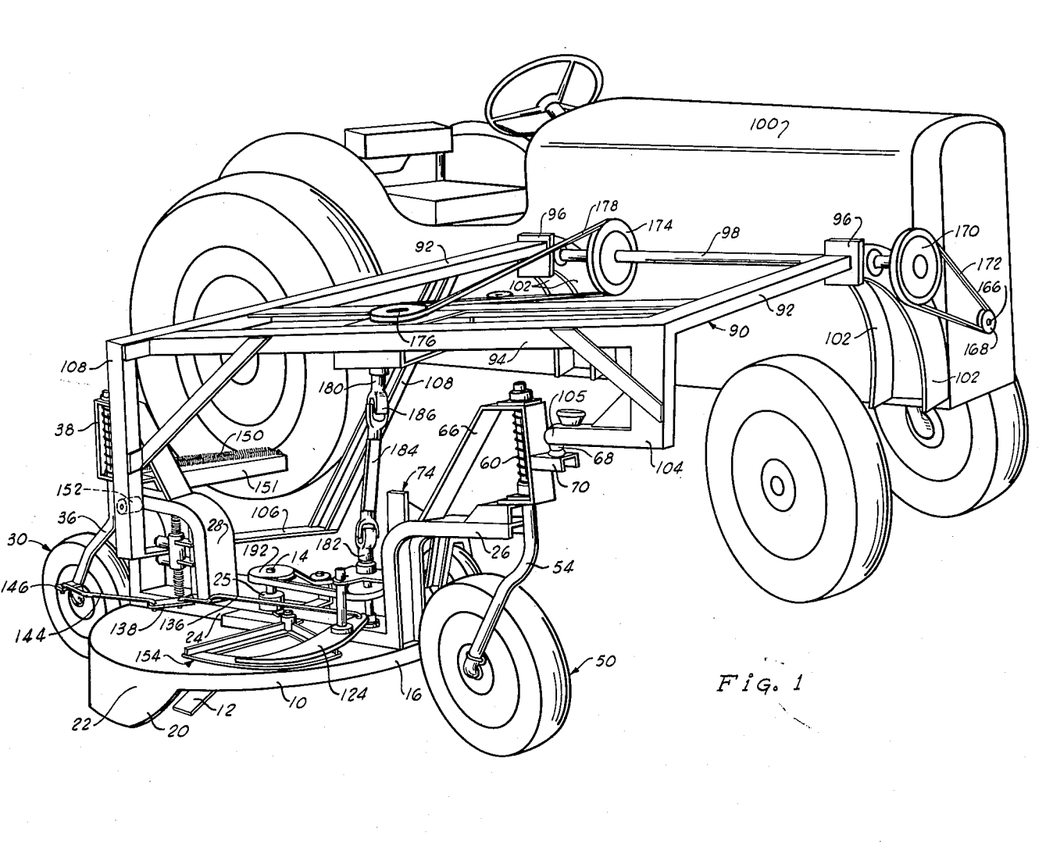
Figure 1 is a perspective view of a tractor operated rotary mower constructed in accordance with this invention.

Referring to the drawings in detail, and particularly Fig. 1, reference character 10 designates a housing forming a guard and a support for a suitable cutter bar 12. The cutter bar 12 is secured on the lower end of a drive shaft 14 suitably supported through the center of the housing 10 for rotation of the cutter bar 12 in a horizontal plane about the center of the housing 10. The forward end 16 (see also Fig. 4) of the housing 10 is open to receive the vegetation (not shown) which is to be cut. The rear end 18 of the housing 10 is also open (not shown) to provide a discharge of the cut vegetation directly behind the mower as the mower is moved over the ground. Suitable flanges 20 depend from the opposite sides of the housing 10 to guard the cutter bar 12 and prevent the cutting of objects which might inadvertently come in contact with the sides of the housing. The bottom of the housing 10 is, of course, open to permit the cutter bar 12 to cut vegetation over which the housing 10 passes. It will also be observed that one side 22 of the housing 10 is curved substantially in the form of a semi-circle from the forward end 16 to the rear end 18 of the housing, when viewed in plan. This curved side 22 of the housing 10 is provided to facilitate the cutting of vegetation around posts and the like, as will be more fully hereinafter set forth.

A bracing member 24, preferably in the form of an inverted channel-shaped member, is suitably secured to the top of the housing 10 and extends from the front end 16 to the rear end 18 across the center of the housing. The brace 24 supports a suitable bearing 25 for the drive shaft 14, to retain the drive shaft in its proper vertical position with respect to the housing 10. As most clearly shown in Fig. 2, an upwardly and outwardly extending projection 26 is secured to each end of the brace 24. The rear projection 26 extends upwardly and rearwardly over the rear end 18 of the housing 10 and is additionally supported on the housing 10 by an L-shaped brace 28 suitably secured to the top portion of the projection 26 and an intermediate portion of the brace 24. The brace 28 and rear projection 26 are provided to support a castor assembly, generally designated character 30, behind the housing 10 for support of the housing 10 and cutter bar 12.

Figure 4:
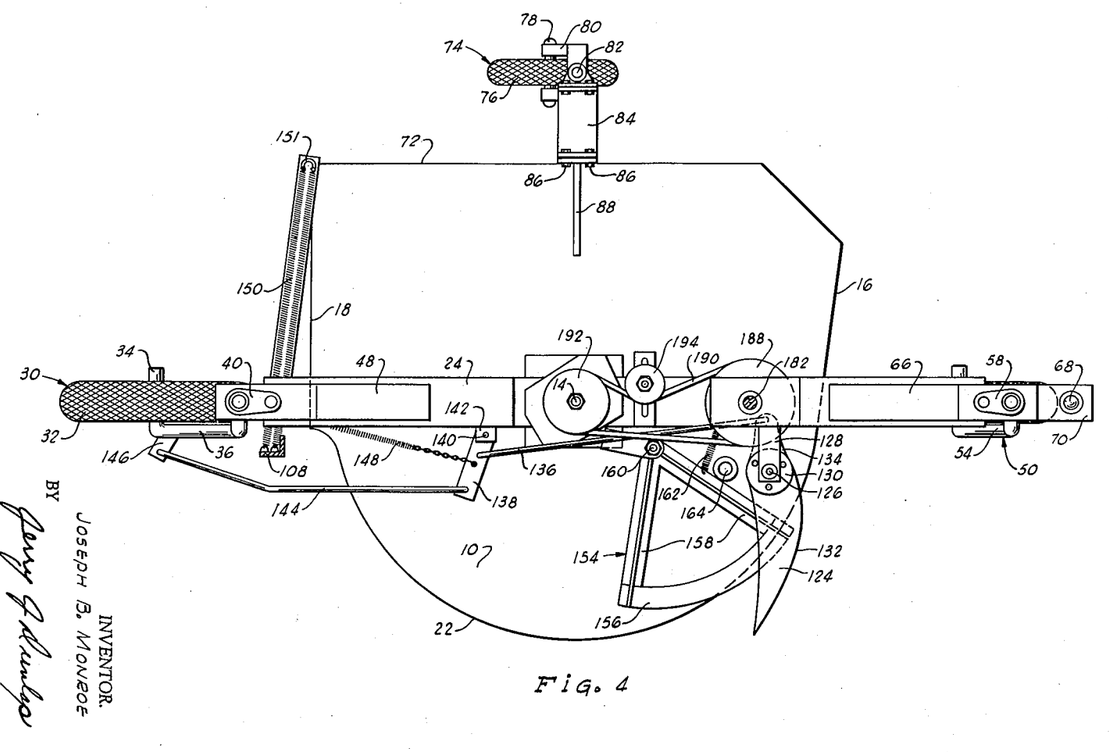
Figure 4 is a plan view of the mower housing and the trigger system for guiding the mower housing in an orbital path.

The castor assembly 30 comprises a suitable wheel 32 rotatably supported on a supporting shaft 34 (see also Fig. 4). The shaft 34 is preferably the lower end of an arm 36 extending forwardly and upwardly from the wheel 32 to perform the function of the usual yoke of a castor. The arm 36 is bent outwardly to permit rotation of the wheel 32, and the upper end portion of the arm 36 extends through a channel-shaped bracket 38. The upper and lower flanges of the bracket 38 are apertured to loosely receive the arm 36, and suitable bearings 40 are secured on each of these flanges to journal the arm 36 in the bracket 38 and facilitate pivotal movement of the castor assembly 30 with respect to the bracket 38. It will also be observed that a helical spring 42 surrounds the arm 36 between the upper and lower flanges of the bracket 38 and is anchored by a locking collar 44 at its lower end to the arm 36, such that the bracket 38 will be elastically supported on the castor assembly 30. The bottom flange of the bracket 38 is supported on the rear ends of the brace 28 and rear projection 26 through a suitable block 46, and the upper flange of the bracket 38 is anchored to the brace 28 by a downwardly and forwardly extending brace 48. Thus, the rear portion of the housing 10 is supported on the castor assembly 30 in such a manner that the castor assembly 30 may be turned or pivoted with respect to the housing 10, and the housing 10 may be moved up and down on the castor assembly 30.

The forward projection 26 extends upwardly and forwardly from the front end 16 of the housing 10 and is supported on a front castor assembly 50 constructed in substantially the same manner as the rear castor assembly 30. The front castor assembly 50 comprises a suitable wheel 52 rotatably supported on the lower end of a forwardly and upwardly extending arm 54 in the same manner as the rear castor assembly. The upper end portion of the arm 54 extends through a channel-shaped bracket 56 and is journaled in suitable bearings 58 secured on the upper and lower flanges of the bracket 56. The arm 54 is also elastically secured to the bracket 56 by a suitable helical spring 60 surrounding the arm between the upper and lower flanges of the bracket and anchored at its lower end to the arm by a collar 62. The lower flange of the bracket 56 is supported on the forward end of the front projection 26 through a suitable block 64, and the upper flange of the bracket 56 is anchored by a plate 66 to an intermediate portion of the front projection 26. Thus, the forward portion of the housing 10 is supported on the front castor assembly 50 in such a manner that the castor assembly 50 may be turned or pivoted with respect to the housing 10, and the forward portion of the housing 10 may be moved up and down with respect to the front castor assembly. It will also be observed that a ball member 68 of a ball and socket type connector is secured to the bracket 56 by a forwardly extending brace 70 in such a position that the ball 68 extends vertically in front of the bracket 56. The ball 68 is provided for pulling the housing 10, as will be described in detail below.

As shown in Figs. 1 and 4, the straight side 72 of the housing 10 is supported by a castor assembly generally designated at 74 to prevent tilting of the housing 10 transversely on the forward and rear castor assemblies 50 and 30, respectively. The castor assembly 74 comprises a suitable wheel 76 supported on a shaft 78 in the lower end of a yoke 80. The upper end of the yoke 80 has a vertical pin 82 extending from the upper end thereof through a brace 84 extending outwardly from the side 72 of the housing 10. The pin 82 is suitably journaled in the brace 84, such that the yoke 80 and wheel 76 may be turned with respect to the housing 10. It is also preferred that the pin 82 be secured in the brace 84 against vertical movement, such that the vertical position of the wheel 76 will be constant with respect to the housing 10. The inner end of the brace 84 is adjustably secured by bolts 86 to a bracket 88 extending vertically from the central portion of the housing 10. Thus, the castor assembly 74 supports the central portion of the side 72 of the housing 10 and prevents the housing 10 from tilting with respect to the forward and rear castor assemblies 50 and 30.

The housing 10 is moved forwardly on the castor assemblies 30, 50 and 74 by a pulling frame (Fig. 1) generally designated by reference character 90 and extending about half way over the housing 10. The frame 90 comprises a pair of transversely extending arms 92 interconnected at their outer ends by a forwardly extending arm 94. Additional bracing of the arms 92 may be provided if desired. The opposite ends of the arms 92 are provided with suitable bearings 96 which are journaled on a shaft 98 supported along the side of a tractor 100. The shaft 98 is journaled in two sets of brackets 102 suitably secured on the side of the tractor 100. Each set of brackets 102 straddles the respective bearing 96 to engage the ends of the bearings 96 and provide forward movement of the frame 90 upon forward movement of the tractor 100. It will be observed, however, that the frame 90 may be pivoted vertically on the shaft 98 with respect to the tractor 100.

The forward end of the arm 94 of the frame 90 extends forwardly of the front transversely extending arm 92 and then downwardly and rearwardly in the form of a U-shaped portion 104. The bottom leg of the U-shaped portion 104 contains a socket member 105 of a size to receive the ball 68 carried by the forward portion of the housing 10. It will thus be observed that forward movement of the pulling frame 90 is transmitted through the ball and socket connection 63—105 to propel the housing 10 forwardly over the ground. However, the housing 10 may be pivoted both horizontally and vertically (about the connection 68—105) with respect to the pulling frame 90, and these relative movements of the housing 10 with respect to the frame 90 must be stabilized.

A curved track 106 is secured to the frame 90 over the rear portion of the housing 10. The track 106 is curved on the arc of a circle having its center in the vertical axis of the ball and socket connection 68—105 which connects the housing 10 to the frame 90. It will also be observed that the track 106 is secured to the frame 90 by arms 108 extending downwardly from the rear transverse arm 92 of the pulling frame. As shown most clearly in Figs. 2 and 3, a shaft 110 is secured in a vertical position along the fore and aft center line of the housing 10 immediately forward of the curved track 106. The lower end of the shaft 110 is anchored in the supporting member 24 extending over the center of the housing 10, and the upper end of the shaft 110 is anchored to the braces 28 and 48 to retain the shaft 110 vertically with respect to the housing 10. A sleeve 112 is slidingly disposed on the vertical shaft 110 and has two stub shafts 114 extending from one side thereof in vertically spaced relation. Each stub shaft 114 has a roller 116 rotatably secured thereon, and the rollers 116 are positioned above and below the track 106 to engage the track 106 and provide vertical movement of the sleeve 112 upon relative vertical movement between the housing 10 and the frame 90. The sleeve 112 is retained in the proper angular position on the shaft 110 by a pair of bifurcated plates 118 extending forwardly from the sleeve to opposite sides of a plate 120 anchored in a vertical position between the support member 24 and the brace 28. The plates 118 will slide up and down on the plate 120 upon vertical movement of the sleeve 112, but will retain the rollers 116 above and below the track 106 in all positions of the housing 10. The sleeve 112 is anchored between the support member 24 and the brace 28 by a pair of helical compression springs 122 surrounding the shaft 110 above and below the sleeve. Thus, the rear portion of the housing 10 may be moved vertically with respect to the pulling frame 90, yet this portion of the housing 10 will be elastically anchored to the frame and minimize vertical vibrations of the housing 10.

Figures 2, 3:
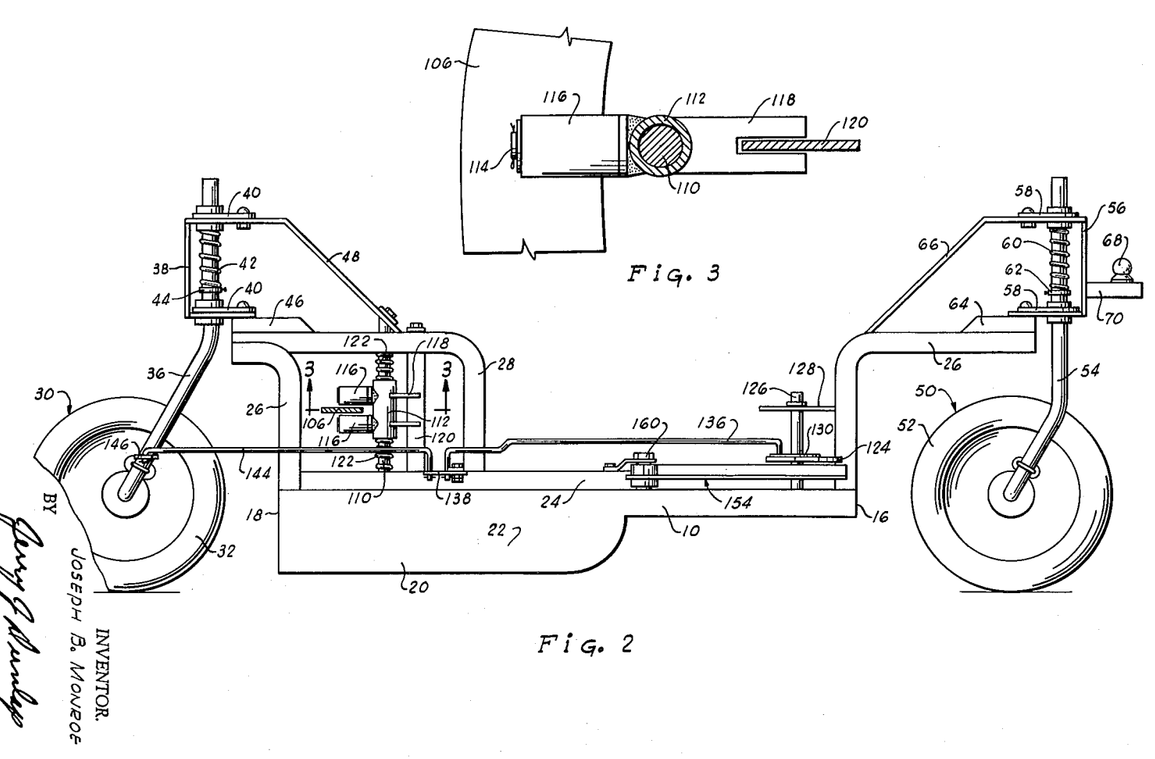
Figure 2 is a side elevational view of the mower shown in Fig. 1, with the mower drive system and pulling frame removed to more clearly illustrate the trigger system for laterally moving the mower housing and cutter.
Figure 3 is an enlarged detailed sectional view as taken along lines 3—3 of Fig. 2.

The horizontal pivoting movement of the housing 10 with respect to the pulling frame 90 is controlled by a trigger system most clearly shown in Figs. 2 and 4. This trigger system comprises a trigger member 124 pivotally secured on a shaft 126 extending vertically from the forward portion of the housing 10. The shaft 126 is anchored at its upper end by a plate 128 extending outwardly from the forward projection 26 for added strength. The trigger 124 is journaled on the shaft 126 by means of a bearing 130 and is of a length to extend beyond the curved side 22 of the housing 10 at the forward end portion of the housing. Thus, as the housing 10 is moved forwardly, the trigger 124 will contact a post or the like before the side 22 of the housing 10 contacts the post. It is also preferred that the leading edge 132 of the trigger 124 be curved to facilitate sliding of the trigger around a post, as will be more fully hereinafter set forth.

An extension 134 extends from the trigger 124 toward the opposite side of the housing 10 and is provided with a vertically extending aperture (not shown) to receive the forward end of a rod 136. The rod 136 is bent and inserted through the aperture in the extension 134, such that the rod 136 may be pivoted horizontally with respect to the extension 134 and trigger 124. The rear end of the rod 136 is also bent and extended through a complementary aperture in the inner end portion of a horizontally extending bell crank 138. The bell crank 138 is pivotally secured on a bolt 140 extending vertically through a bracket 142 which is in turn secured on the supporting member 24 on top of the housing 10. Another rod 144 is pivotally secured at its forward end to the outer end of the bell crank 138, and at its rear end to a bracket 146 secured to the arm 36 of the rear castor assembly 30.

It will thus be apparent that when the trigger 124 is pivoted clockwise (when viewed in plan) the rod 136 is moved forwardly to pivot the bell crank 138 in a counter-clockwise direction. The movement of the bell crank 138 is transmitted through the rod 144 to move the bracket 146 forwardly and turn the rear castor assembly 30 in a counter-clockwise direction. The rear castor assembly 30 will then be turned in a direction away from the curved side 22 of the housing 10 and guide the rear portion of the housing 10 in a clockwise direction around the ball and socket connection 68—105. A suitable spring 148 is anchored between the bell crank 138 and the rear projection 26 to constantly urge the bell crank 138 in a clockwise direction and the trigger 124 in a counter-clockwise direction. Thus, whenever the trigger 124 is pivoted in a clockwise direction, it will be returned to its forward position, as illustrated in Fig. 4, as soon as it is released. It should also be noted that when the housing 10 is moved or pulled in a generally forward direction, the rear castor assembly 30 will tend to align itself with the path of movement of the forward castor assembly 50. Thus, when the housing 10 is moved in a substantially straight line in a forward direction, the rear castor assembly 30 will be positioned as illustrated in Fig. 4, to in turn position the trigger 124 in the position shown in Fig. 4. No stop need be provided for the trigger 124 to limit its counter-clockwise movement upon being released. In fact, no stop should be provided, since the castor assembly 30 will be turned in a clockwise direction toward the curved side 22 of the housing 10 when the housing 10 passes by a post, as will be more fully hereinafter set forth. And, the trigger 124 is actually pivoted counter-clockwise from its position shown in Fig. 4 for a very short period of time. At any rate, it will be apparent that the rods 136 and 144 and the bell crank 138 form a linkage between the trigger 124 and the rear castor assembly 30 top provide a transmission of movement between the trigger 124 and the rear castor assembly 30.

As the housing 10 is pulled by the frame 90 in a normal straight line mowing operation, the housing 10 must be retained in such a position that the forward and rear castor assemblies 50 and 30 are aligned along the path of movement. For this purpose, I provide a pair of tension springs 150 (Figs. 1 and 4) anchored between an arm 151 carried by the housing 10 and the outer depending arm 108 of the frame 90. The springs 150 constantly urge the rear portion of the housing 10 in a counterclockwise direction around the ball and socket connection 68–105, or outwardly with respect to the pulling frame 90. The outward movement of the rear portion of the housing 10 is limited by a suitable elastic bumper 152 secured on the outer arm 108 of the frame 90 in a position to contact the rear projection 26 of the housing 10. When the rear projection 26 is in contact with the bumper 152, the forward and rear castor assemblies 50 and 30 are in alignment with the path of movement of the pulling frame 90.

As also shown in Figs. 1 and 4, I also provide a walking device 154 for assisting the trigger system in pivoting the rear portion of the housing 10 outwardly from a post. The walking device 154 comprises a cam in the form of a curved bar 156 secured on the outer ends of a pair of arms 158 which are in turn pivotally secured at their inner ends on a shaft 160 extending upwardly from the housing 10. The device 154 is arranged between the forward end of the housing 10 and the central portion of the housing, with the bar 156 extending between the top of the housing 10 and the trigger 124. The arms 158 are of a length to extend the bar 156 beyond the curved edge 22 of the housing 10 when the device 154 is in its normal forward position as illustrated in Fig. 4. A spring 162 is anchored between one of the arms 158 and a portion of the housing 10 to constantly urge the walking device 154 in a counter-clockwise direction around the shaft 160. This counter-clockwise movement is limited by a suitable bumper 164, such that a portion of the bar 156 normally extends forwardly of the curved side 22 of the housing 10 to contact a post previously contacted by the trigger 124, before the post can come into contact with the side 22 of the housing 10. The walking device 154 serves to engage a post and be pivoted in a clockwise direction as the mowing apparatus proceeds forwardly with respect to the post, to urge the rear portion of the housing 10 in a clockwise direction around the ball and socket connection 68–105 of the housing to the frame 90, as will be more fully hereinafter disclosed.

The drive shaft 14 of the cutter bar 12 may be rotated in any desired manner to turn the cutter bar 12 in a horizontal plane in the housing 10 and cut vegetation over which the housing 10 is pulled. When the tractor 100 is provided with a power take-off 166, it may be conveniently connected to the cutter drive shaft 14 by a system of belts and pulleys. For example, a pulley 168 is mounted on the power take-off and a mating pulley 170 is mounted on the forward end of the shaft 98 which supports the inner end of the frame 90. An endless belt 172 extending around the pulleys 168 and 170 to provide rotation of the shaft 98 upon operation of the power take-off 166. Rotation of the shaft 98 is transmitted through a pair of pulleys 174 and 176 and an endless belt 178 to a shaft 180 journaled in the outer end portion of the frame 90 above the housing 10. The shaft 180 may be extended in a substantially vertical direction. The shaft 180 is connected to a stub shaft 182 mounted on the forward portion of the housing 10 by another shaft section 184 connected at its opposite ends to the shafts 180 and 182 by universal joints 186. It will thus be observed that torque will be transmitted from the shaft 180 to the shaft 182, even though the housing 10 is pivoted horizontally with respect to the frame 90 around the ball and socket connection. However, I prefer to mount the shaft 182 on the forward portion of the housing 10 to minimize the movement of the shaft 182 with respect to the shaft 180 and minimize the swinging movement of the connecting shaft 184.

Another pulley 188 is mounted on the stub shaft 182 and is connected to the cutter bar drive shaft 14 by an endless belt 190 and a pulley 192 mounted on the upper end portion of the shaft 14. The belt 90 is retained under tension by an idler pulley 194 suitably mounted on the top of the housing 10 in such a manner that it may be adjusted laterally to vary the tension of the belt 190.

*Operation*

The normal straight line operation of the mower assembly is believed apparent from the foregoing description, in that forward movement of the tractor 100 is transmitted through the frame 90 and the ball and socket connection 68—105 to pull the housing 10 forwardly. The springs 150 will retain the rear projection 26 of the housing 10 in contact with the bumper 152 in the absence of obstructions in the path of movement of the housing 10, such that the rear castor assembly 30 will track behind the forward castor assembly 50 and the housing 10 will move in a substantially straight path parallel with the path of movement of the tractor 100. Simultaneously with movement of the tractor 100, the power take-off 166 will be placed in operation to rotate the cutter bar 12 (through the belt and pulley drive system previously described) to cut the vegetation over which the housing 10 is moved.

It should also be noted that the castor assemblies 30, 50 and 74 will facilitate the movement of the housing 10 when the tractor 100 is turned in a curved path, as when the tractor is turned around a corner, such that the path of movement of the housing 10 will ordinarily be parallel with the path of movement of the tractor 100. Also, the frame 90 may be pivoted vertically on the shaft 98, such that the mower housing 10 may be moved along a slanted side of a bar ditch or the like while the tractor 100 is driven along a substantially level surface. In other words, the housing 10 may be moved along a slanted surface which is either higher than or lower than the level at which the tractor 100 is operated, such that all of the areas along a highway right-of-way, for example, may be efficiently mowed with the present apparatus without placing undue strain on any portion of the mowing apparatus.

Figures 5, 6, 7:
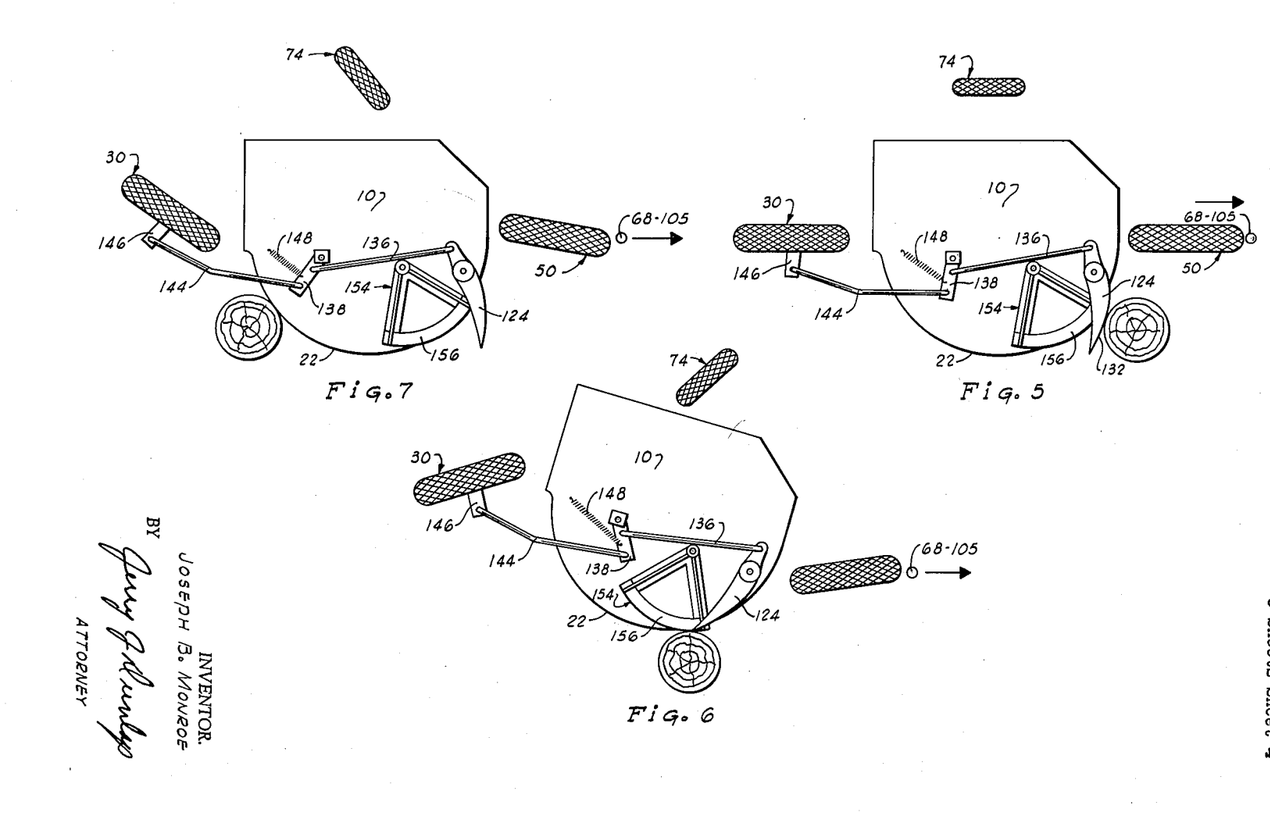
Figure 5 is a schematic plan view of the mower, illustrating the operation of the mower in initially engaging a post.
Figure 6 is another schematic plan view, illustrating the operation of the mower during an intermediate portion of the movement of the mower around a post.
Figure 7 is still another schematic plan view of a mower, illustrating the position of the mower as it is leaving a post.

When it is desired to cut the vegetation around a post or the like, as illustrated in Figs. 5–7, the housing 10 is moved in a forward direction toward the post, with the outer end of the frame 90 being just inwardly of the post. Thus, the trigger 124 will be first brought into contact with the post as illustrated in Fig. 5. It may also be noted that each of the castor assemblies 30, 50 and 74 are aligned with the forward movement of the housing 10 when the trigger 124 first makes contact with the post. The tractor 100 is driven on in a forward direction to slide the trigger 124 along the side of the post and pivot the trigger 124 in a clockwise direction as illustrated in Fig. 6. This movement of the trigger 124 is transmitted through the linkage system to turn the rear castor assembly 30 in a direction away from the curved side 22 of the housing 10, that is, away from the post. As a result, the rear portion of the housing 10 is guided in a direction generally away from the post around the ball and socket connection 68—105. Also, the other castor assemblies, 50 and 74, will assume a slanted direction upon the initial pivoting movement of the housing 10.

The walking device 154 assists the trigger system in initially directing the rear portion of the housing 10 away from the post. Immediately after the trigger 124 is brought into contact with the post, the leading end of the bar 156 is also brought into contact with the post. A continued forward movement of the housing 10 provides a pivoting of the walking device 154 in a clockwise direction, such that the walking device 154 imposes a force on the housing 10 in a direction away from the post. In other words, the device 154 walks the housing 10 around the obstructing post during the initial portion of the movement of the housing around the post.

When the walking device 154 has been pivoted about 45°, the bar 156 thereof is moved inwardly of the curved side 22 of the housing 10 and the trigger 124 has been moved beyond the center of the post. At this time, the post comes in contact with the curved side 22 of the housing and slides along this curved side to provide a cutting of the vegetation immediately adjacent the respective side of the post. It will also be noted that the forward portion of the curved side 22 of the housing 10 is in proximity with the post to effectively cut vegetation next to the side of the post originally contacted by the trigger 124.

As soon as the trigger 124 has been moved beyond the obstructing post, the trigger is released, and the spring 148 tends to return the rear castor 30 to its original position in line with the center line of the housing 10. Simultaneously, the springs 150 (Figs. 1 and 4) tend to swing the housing 10 in a counter-clockwise direction, such that the curved side 22 of the housing 10 is rubbed along the sides of the post, and the housing 10 is gradually returned to a path of movement in alignment with the frame 90. As will be observed in Fig. 7, the rear castor assembly 30 and the side castor assembly 74 will be turned outwardly from the tractor 100 as the housing 10 is pivoted in a counter-clockwise direction back into alignment with the supporting frame 90, since these castor assemblies will tend to track along the path of movement of the housing 10. It should also be noted that the springs 150 will retain the curved side 22 of the housing 10 into contact with the post until the housing 10 is moved completely beyond the post, whereby the vegetation surrounding at least one-half the periphery of the post will be mowed by the cutter bar 12.

The portion of the periphery of the post which may be contacted by the curved side 22 of the housing 10 will, of course, depend upon the distance which the housing 10 protrudes outwardly from the pulling frame 90. However, this distance will be larger than the diameter of all posts normally encountered in a mowing operation, such that at least one-half of the vegetation surrounding a post may be cut with one pass of the mower by the post, and, of course, the remainder of the vegetation around the post may be cut when the mower is moved in the opposite direction around the opposite side of the post.

During any movement of the housing 10, the castor assemblies 30, 50 and 74 will naturally follow the contour of the ground, and the housing 10 will normally be moved up and down with respect to the frame 90 when the rear castor assembly 30 and the side castor assembly 74 contact small rocks or enter small holes or depressions. Thus, the housing 10, and particularly the rear portion of the housing 10, will tend to vibrate vertically with respect to the frame 90. In the present construction, however, the rollers 116 will engage the curved track 106 depending from the frame 90 when the rear portion of the housing 10 is moved vertically with respect to the frame 90, such that the compression springs 122 will dampen the vertical vibration of the housing 10 with respect to the frame 90. It should also be noted that the rollers 116 will be positioned above and below the track 106, regardless of the horizontal angle at which the housing 10 is disposed with respect to the pulling frame 90.

Figure 8:
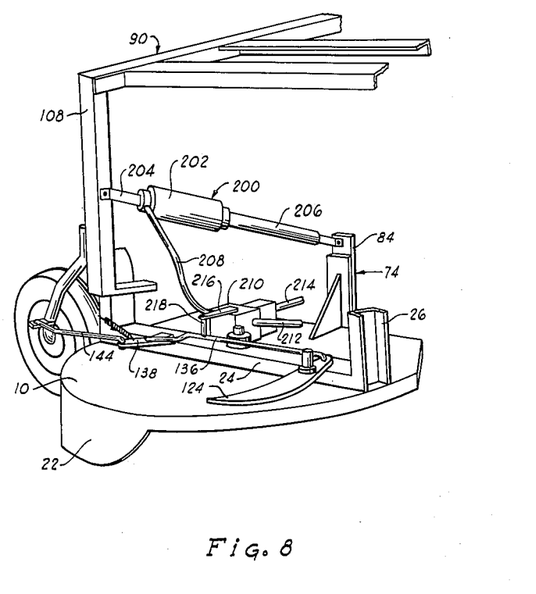
Figure 8 is a partial perspective view of a modified mower construction incorporating the present invention.

This invention also contemplates the use of a hydraulic ram 200, as shown in Fig. 8, in lieu of the walking device 154, to assist the guidance of the rear castor assembly 30 in moving the rear portion of the housing 10 laterally when the trigger 124 contacts a post or the like. The ram 200 also has utility when used independently, particularly in a mower construction (not shown) wherein the mower housing is completely supported by a pulling frame.

The ram 200 comprises a hydraulic cylinder 202 having an extension 204 on one end thereof pivotally secured to the outer arm 108 of the pulling frame 90. The plunger 206 of the ram 200 extends into the opposite end of the cylinder 202 and is pivotally secured to the plate 84 of the side castor assembly 74, or directly to the housing 10. Fluid is directed to and from the cylinder 202 by a flexible hose 208 extending from a two-position, two-way valve 210. The valve 210 is suitably secured on the housing 10, and also has an inlet conduit 212 and a return conduit 214 connected thereto. The inlet conduit 212 extends to a supply of hydraulic fluid (not shown), such as a hydraulic system of the tractor 100, and the return conduit 214 communicates with a suitable sump (not shown), such as the fluid supply of the auxiliary hydraulic system on the tractor 100 feeding fluid to the supply conduit 212.

A lever 216 extends from the valve 210 to turn the valve member (not shown) of the valve to either direct fluid from the inlet conduit 212 to the hose 208, or from the hose 208 to the return conduit 214. The outer end of the lever 216 is suitably connected by an arm 218 to an intermediate portion of the trigger linkage rod 136 for movement of the lever 216 with the trigger 124.

When the trigger 124 is in its forward position extending forward of the curved side 22 of the housing 10 for contact by a post, the lever 216 is in its rear position to so position the valve member of the valve 210 that the hose 208 is in communication with the return conduit 214 and the supply conduit 212 is closed. Thus, fluid may flow freely from the cylinder 202 through the return 214, and the ram 200 will impose no force on the housing 10, such that the springs 150 (Fig. 1) will retain the housing 10 in alignment with the path of movement of the tractor.

When the trigger 124 is pivoted clockwise, as when contacting a post previously described, the lever 216 is moved forwardly to shift the valve member of the valve 210 in an alternate position. In this alternate position, the return conduit 214 is closed and fluid is fed from the supply conduit 212 through the hose 208 to the end of the cylinder 202 opposite the plunger 206. The plunger 206 is therefore moved partially out of the cylinder 202 and imposes a force on the housing 10 in a direction away from the curved side 22. Fluid will continue to be supplied to the cylinder 202 until the trigger 124 is released and returns to its forward position. Thus, the ram 200 operates to impose a transverse force on the housing 10 and assist the rear castor assembly 30 in moving the rear portion away from a post during the initial movement of the mower around the post.

As the trigger 124 is released and returns to its forward position, as previously described, the supply conduit 212 is again closed and the hose 208 opened to the return conduit 214. Fluid will then flow out of the cylinder 202 as the springs 150 swing the housing 10 in a counter-clockwise direction, and the plunger 206 will move back into the cylinder 202 with no appreciable resistance.

From the foregoing it will be apparent that the present invention will materially reduce the time required in the caretaking of highway right-of-ways and the like. The present mowing apparatus may be used to cut the vegetation around all of the obstructions normally encountered in a mowing operation, without the necessity of stopping and backing up the mowing apparatus, and without the use of hand clipping or cutting operations. The present mowing apparatus is constructed in such a manner that the cutter bar is automatically moved in an orbit around about one-half the periphery of a post or the like, without the cutter bar or its supporting structure being driven directly into contact with the post. The mower housing is initially moved in a orbital path by a novel trigger system to minimize contact of the housing with a post, and the trigger system may be assisted by a walking device or a hydraulic ram during the initial orbital movement of the mower housing. It will also be apparent that the present mowing apparatus is simple in construction, will have a long service life and may be economically manufactured.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:

1. In a mower for cutting vegetation around posts and the like, the combination of: rotary cutting means, housing means supporting and guarding the cutting means; driving means pivotally connected to one end of the housing means for moving the housing means over the vegetation, with the housing means extended at various angles with respect to the path of movement of the driving means; castor means pivotally supporting the opposite end of the housing means, trigger means pivotally carried by the housing means in a position to extend forwardly of one side portion of the housing means for contacting a post prior to contact thereof by the respective side of the housing means; linkage means connected between the trigger means and castor means for turning the castor means in a direction away from the post when the trigger means is pivoted by the post; and spring means connected between the housing means and driving means for urging the housing in a direction opposite to the first-mentioned direction, whereby said side of the housing means is guided around the post.

2. A mower as defined in claim 1 characterized further in that said side of the housing means is curved substantially in the form of a semi-circle to slide around the post.

3. A mower as defined in claim 1 characterized further in that said castor means is secured to the rear end portion of the housing means, said driving means is connected to the forward end portion of the housing means, and additional castor means is pivotally secured to the side of the housing opposite the first-mentioned side.

4. In a mower for cutting vegetation around posts and the like, the combination of: a mower housing having an open bottom and one side thereof curved substantially in the form of a semicircle from the forward to the rear end of the housing, a castor assembly pivotally secured to the rear portion of the housing and extending below the housing, a frame, drive means connected to the frame for moving the frame in a substantially horizontal path, a swiveled connection between the frame and the forward portion of the housing to pull the housing over the vegetation to be cut and so positioned that the curved side of the housing projects beyond one side of the frame, a cutter pivotally secured in the housing for cutting vegetation over which the housing passes, a trigger pivotally secured to the housing and extending forwardly of a portion of the curved side of the housing for contacting a post adjacent the path of movement of the frame prior to contact by the curved side of the housing, a linkage connected between the trigger and the castor assembly for turning the castor assembly away from the curved side of the housing when the trigger is pivoted by contact with a post and for guiding the rear portion of the housing around said swiveled connection in a direction away from the post, and a spring connected between the housing and frame constantly urging the rear portion of the housing in a direction opposite to the first-mentioned direction, whereby the curved side of the housing follows around a portion of the periphery of the post.

5. The combination defined in claim 4 characterized further to include an arm pivotally secured to the mower housing for pivotal movement in a horizontal plane, and a horizontally extending cam secured on the outer end of the arm in a position to receive a post contacted by the trigger before the curved side of the housing contacts the post and move rearwardly with the post to urge the rear portion of the housing away from the post during the initial movement of the housing around the post.

6. The combination defined in claim 4 characterized further to include a track carried by the frame over the rear portion of the housing and curved in a horizontal plane on the arc of a circle having its center at said swiveled connection, a pair of vertcially spaced rollers straddling said track and slidingly carried by the housing for vertical movement, and springs positioned above and below said rollers against portions of the housing to minimize vertical vibration of the rear portion of the housing with respect to said frame.

7. In a mower for cutting vegetation around posts and the like, the combination of: housing means having an open bottom and one side thereof curved, castor means pivotally secured to the forward and rear ends and the side of the housing means opposite the curved side, means pivotally secured to the forward end of the housing for pulling the housing forwardly over the vegetation to be cut, cutter means rotatably secured in the housing for rotation in a substantially horizontal plane and cutting vegetation over which the housing moves, trigger means pivotally secured to the housing means and extending forwardly of the curved side of the housing means for pivotal movement when contacted by a post, linkage means connecting the trigger means to one of the castor means for turning said castor means away from the curved side of the housing means when the trigger means is pivoted by a post for lateral movement of the housing in a direction away from the contacted post, and spring means between the housing means and pulling means constantly urging the housing laterally in a direction opposite to the first-menitoned direction.

8. A mower as defined in claim 7 characterized further in that said linkage means comprises a bell crank pivotally secured to the housing means between the trigger means and the rear castor means, a rod pivotally secured to the inner end portion of the bell crank and the trigger means, a rod pivotally secured to the outer end portion of the bell crank and the rear castor means, and a spring anchored between the bell crank and the housing means urging the bell crank in a direction to move the trigger means forwardly.

9. A mower as defined in claim 7 characterized further to include cam means pivotally carried by the housing means to contact a post after contact thereof by the trigger means and to urge the rear portion of the housing means away from the post during the initial movement of the mower around the post.

10. A mower as defined in claim 7 characterized further in that said trigger means comprises a bar having a curved leading edge on the portion thereof normally projecting forwardly of the curved side of the housing means.

11. Apparatus of the character described, comprising in combination; a tractor; a frame pivotally secured to one side of the tractor for movement forwardly and rearwardly with the tractor at various vertical angles between the frame and tractor; a mower housing pivotally secured at its forward end to the outer end of the frame for forward movement of the housing with the frame at various horizontal angles between the housing and frame, the outer portion of the housing being projected outwardly of the frame when the housing is aligned with the frame; castor assemblies pivotally secured to the forward and rear ends and the inner edge of the housing to support the housing; a cutter blade rotatably secured in the housing; a drive system for the cutter blade; a trigger pivotally secured on the housing in a position to extend forwardly of the outer edge of the housing and contact an obstruction outwardly of and adjacent to the path of movement of the frame; a linkage connecting the trigger to the rear castor assembly, for turning the rear castor assembly toward the tractor when the trigger strikes an obstruction, and guiding the rear portion of the housing inwardly toward the tractor, and a spring anchored between the frame and the rear portion of the housing to return the rear portion of the housing outwardly when the trigger passes the obstruction, whereby the housing is moved in an orbit around a portion of the obstruction.

12. Apparatus as defined in claim 11 characterized further in that the outer portion of the housing projecting outwardly of the frame is curved substantially in the form of a semi-circle, in plan, to slide around the obstruction contacted by the trigger, and a segmentally shaped bumper is pivotally secured on the housing in a position to contact an obstruction contacted by the trigger and pivot horizontally as the housing moves forwardly with respect to the obstruction to assist in pivoting the rear portion of the housing inwardly from the obstruction.

13. Apparatus as defined in claim 11 characterized further in that the housing is swivelly secured to the outer end of the frame for movement of the rear portion of the housing vertically and horizontally with respect to the frame, a horizontally extending track secured on the frame over the rear portion of the housing and curved on the arc of a circle having its center in the swivel connection of the housing to the frame, rollers vertically straddling the track, and means elastically securing the rollers on the housing for minimizing vertical vibration of the rear portion of the housing relative to the frame.

14. Apparatus of the character described, comprising, in combination, a tractor having a power take-off, a horizontally extending shaft rotatably secured on one side of the tractor, a frame pivotally secured to horizontally spaced portions of the shaft, brackets on the tractor engaging the frame to provide forward movement of the frame with the tractor, a mower housing secured at its forward end to the outer end of the frame for forward movement with the tractor, the housing being connected to the frame for pivotal movement around a vertical axis with respect to the frame and being secured at approximately the center line of the housing to normally project the outer edge of the housing outwardly of the frame, castor assemblies pivotally secured to the forward and rear ends and the inner side of the housing and projecting below the housing to support the housing, a trigger pivotally secured to the housing in a position to project forwardly of the outer edge of the housing, a linkage connecting the trigger to the rear castor assembly for turning the rear castor assembly upon pivotal movement of the trigger, a spring connected between the rear portion of the housing and the frame constantly urging the rear portion of the housing outwardly, a cutter blade rotatably supported in the housing, and a drive system connecting the cutter blade to the tractor power take-off.

References Cited in the file of this patent

UNITED STATES PATENTS

| | | |
|---|---|---|
| 2,411,623 | Jaques | Nov. 26, 1946 |
| 2,489,633 | Fulgham | Nov. 29, 1949 |
| 2,509,914 | Goodwine | May 30, 1950 |
| 2,531,557 | Dayton | Nov. 28, 1950 |
| 2,749,824 | Friday | June 12, 1956 |
| 2,791,081 | Allen et al. | May 7, 1957 |
| 2,851,842 | Harp | Sept. 16, 1958 |
| 2,857,728 | Smith et al. | Oct. 28, 1958 |

FOREIGN PATENTS

| | | |
|---|---|---|
| 1,029,317 | France | Mar. 4, 1953 |